March 8, 1927.
C. H. SMOOT
1,620,240
FLOW REGULATOR
Filed May 27, 1926　　2 Sheets-Sheet 1
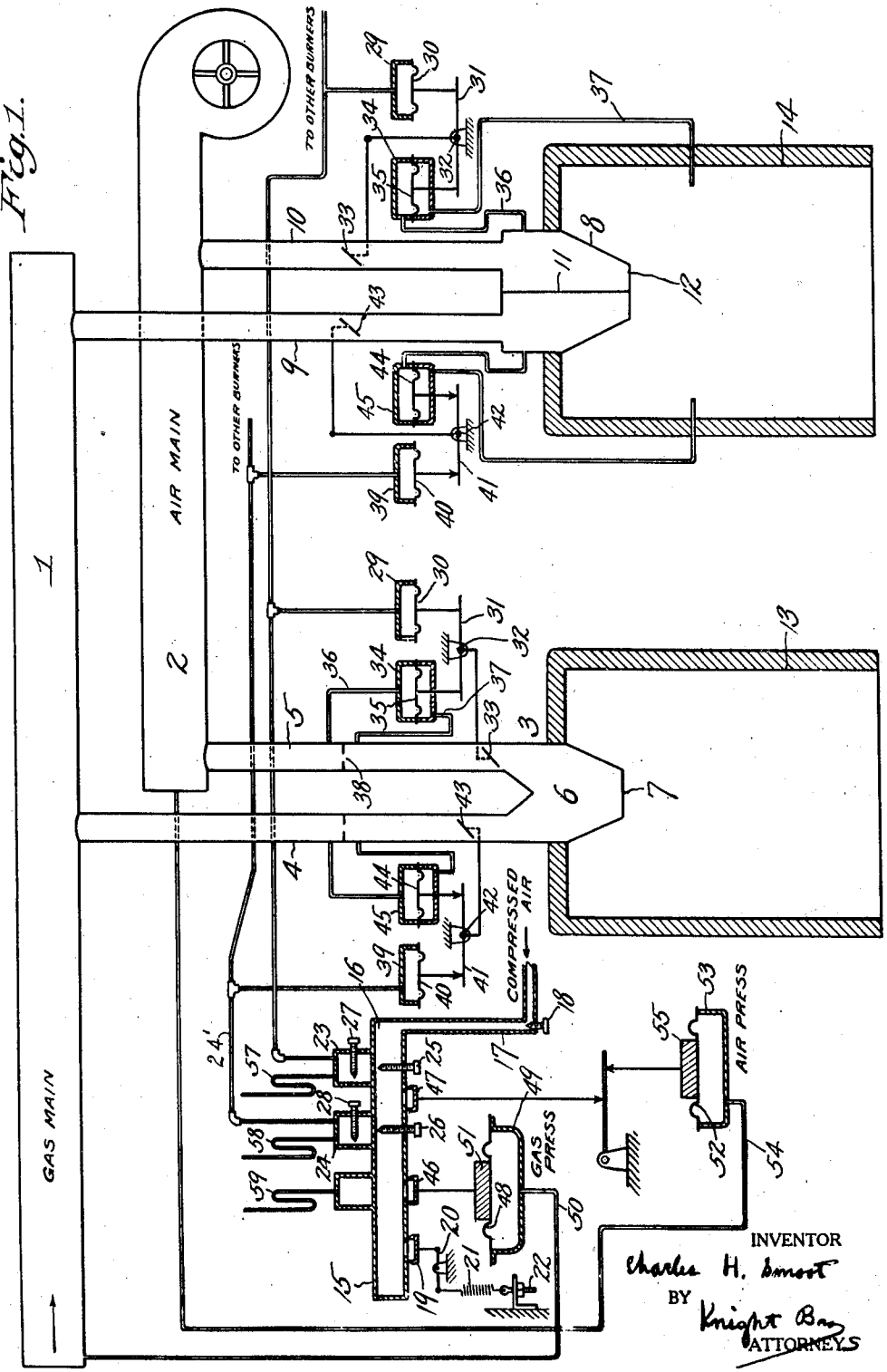
INVENTOR
Charles H. Smoot
BY
Knight Bro
ATTORNEYS

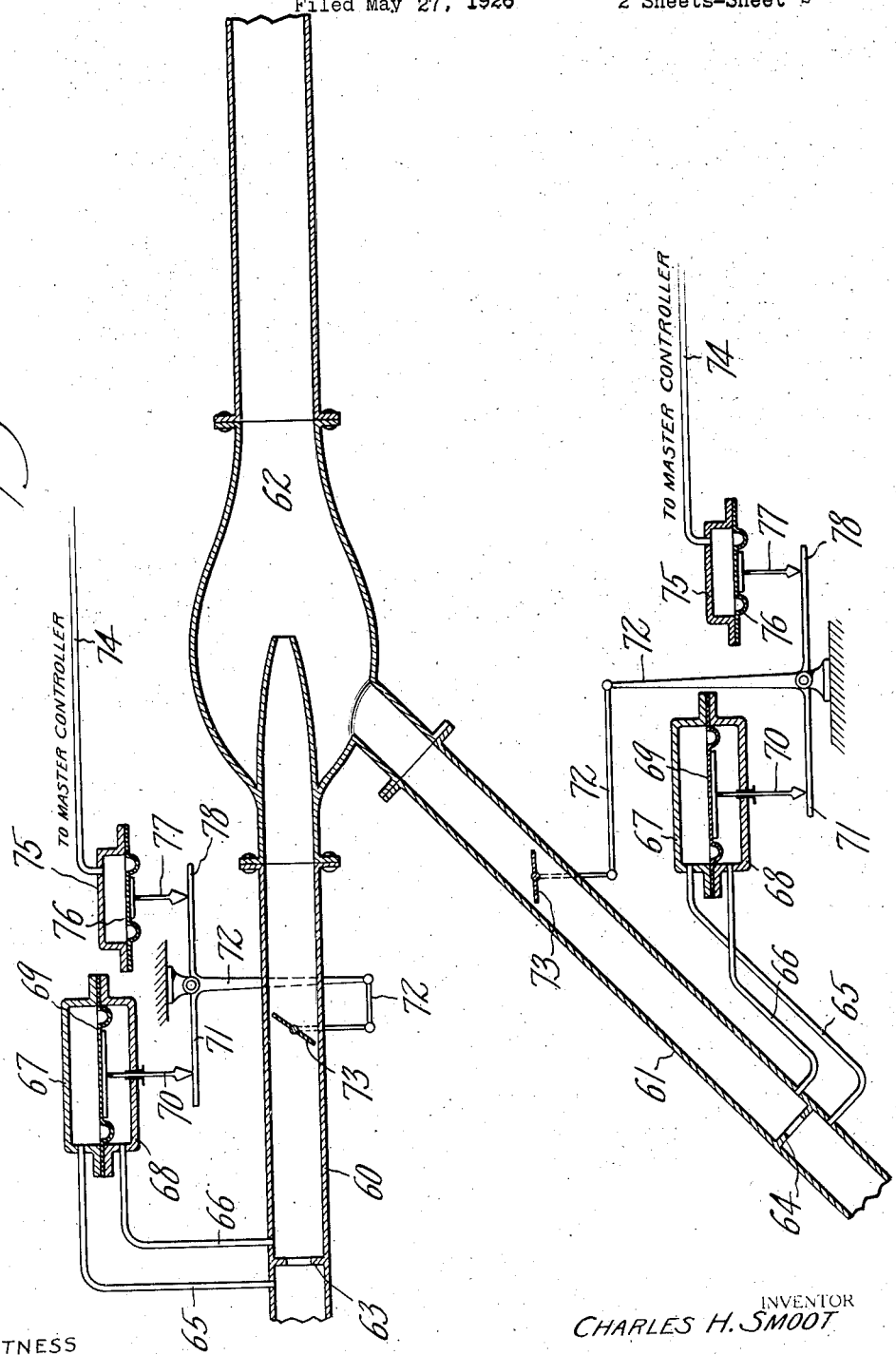

Patented Mar. 8, 1927.

1,620,240

UNITED STATES PATENT OFFICE.

CHARLES H. SMOOT, OF MAPLEWOOD, NEW JERSEY.

FLOW REGULATOR.

Application filed May 27, 1926. Serial No. 112,188.

This invention relates to regulators for controlling the proportional flow of fluids requiring definite ratios of mixture for accomplishing certain industrial results.

The object of the invention is to combine master control means for regulating the supply of fluid mixtures, with corrective means responsive to the rate of flow of the individual constitutents to check the flow varying effort of the master control means.

A further object is to combine with the above described means a master controller regulating from a central or distant point the ratio of flow between the constituents of the mixture as well as the total quantity of the flow.

A further object is to combine with such a master controller a plurality of receptive devices responding to the requirements of such controller, said devices having individual checking or balancing means to insure that while each individual device will respond to the general demands, the flow of the constituents controlled by each device will be held at the proper ratio to give a predetermined result.

Another purpose of the invention is to provide means which upon the cessation of the supply of one of the constituents, the supply of one or more of the constituents will be shut off.

As examples of the application of the invention, may be cited the regulation or control of a mixture of air and gas for heating purposes, whereby the total amount and also the ratio of the constituents may be held within certain predetermined limits; or the mixture of blast furnace gas with coke oven gas or natural gas with Blau gas may be so controlled to give a certain heating value. Likewise other fluids such as oils of different gravities as, for example, kerosene and fuel oil may have their ratio and quantity regulated to give a desired specific gravity or a desired heating value. In each case the master controller will be made responsive to the required quality and quantity and will, when proper adjustments are made, automatically vary the constituents to bring about the desired result.

The invention will now be described with reference to the accompanying drawing in which—

Figure 1 represents a diagrammatic section of a particular application of the invention to the control of air and gas supply to burners, and Figure 2 is a diagrammatic view of the application of the invention to the control of liquid mixtures.

Referring to Figure 1, a gas main is shown at 1 and an air main at 2. At 3 is shown a burner of the type where gas supplied through the burner gas pipe 4 and air supplied through the burner air pipe 5 are mixed in a chamber 6 before issuing from the orifice 7 of the burner, where combustion takes place. At 8 is illustrated another type of burner which may be called an orifice burner, in which the gas from the gas burner supply pipe 9 and the air from the burner air pipe 10 are kept apart in the burner by, for example, a partition 11, until they reach the orifice of the burner where they become mixed as they ignite at the orifice 12. 13 and 14 may represent any form of furnace. At 15 is shown a master controller which may be located at any central point more or less remote from the burners. The controller comprises an air chamber 16 supplied with compressed air by pipe 17 from any suitable source, an adjusting cock 18 serving to regulate the flow of air to the chamber. Instead of air, any other fluid under pressure may be used for this purpose. The pressure of the air in the chamber 16 is controlled by a valve 19 which is shown coupled by lever 20 to a spring 21, the tension of which is adjustable by screw 22. It will be understood that by adjusting the screw 22, the pressure in chamber 16 may be raised or lowered to any desired setting.

It will also be understood that instead of the loading of the valve 19 controlling the pressure in chamber 16 by means of a spring 21, the valve 19 may be under the control of some such device as a piston or diaphragm operating under a pressure of steam, for example, engendered by the heat from the burners. Leading off from said chamber 16 are control conduits 23, 24, the admission of compressed fluid to which is controlled by valves 25, 26. Other valves 27, 28 are used to permit the escape of air from the conduits. By adjusting the valves, admitting air to the conduits and permitting air to escape from the conduits, the pressure in the conduits may be set at any desired proportion to the pressure in the chamber 16 and will follow this proportion as the pressure in chamber 16 varies. The variation of pressure in chamber 16 by the escape valve 19 is limited to the working range of the controller. The conduit 23 is in communication with chambers 29, one for each burner air pipe, and these chambers have diaphragms 30 that, operating on levers 31 pivoted at 32, tend to open valves or dampers 33 in the burner air pipe. Opposed to this tendency is the pressure in chambers 34, having diaphragms 35, the opposite sides of which receive pressure from pipes 36 and 37, the said pressures being of different values due to the fact that the pipes 36 and 37 are displaced longitudinally in the burner air current. In the case of the orifice type burner at 8 this differential pressure is enhanced by having the pipe 36 communicate with the burner while the pipe 37 opens into the furnace or into the atmosphere while in the mixed type of burner 3 the pressure is enhanced by having a restricted orifice as at 38. Similarly pipe 24' from the master controller leads to chambers 39 which have closing diaphragms 40 which, acting on levers 41, pivoted at 42, tend to open dampers or valves 43 in the burner gas pipes 4 and 9. This tendency to open the valves 43 is opposed by diaphragms 44 in chambers 45, the chambers on the opposite sides of the diaphragms 44 being in communication with openings in the air current displaced longitudinally as in the case of the gas current. From the above description, it will be seen that the efforts of the master controller to adjust the valves in the burner air and gas pipes according to the demand required by the setting of the controller are counterbalanced by forces proportional to the square of the velocity of the air and gas flowing to the burners which is the ratio that should exist where the burners are required to give an output in heat proportional to a demand as indicated by a variation in pressure due to the heat. In the event of a substantial variation in either the gas pressure or the air pressure supplying the burners, it becomes imperative to have the gas shut off automatically as otherwise dangerous conditions, due to escape of unburned gas, might result. I, therefore, provide the master controller chamber 16 with two other relief valves 46 and 47. Valve 46 is held closed by a diaphragm 48 in a chamber 49 that is in communication through pipe 50 with the gas main. A suitable load which may be a weight, as shown at 51, resting on the diaphragm 48, serves to open wide the valve 46 in case the gas pressure in the gas main fails. The load must be such that the pressure in pipe 50 will be unable to open the valve 46 in any degree during the fluctuations controllable within the range of valve 19. Similarly valve 47 is under the control of diaphragm 52 and chamber 53 that is in communication through pipe 54 with the air main. Loading means 55 tend to open the valve 47 against the pressure in the chamber 53 and will effect this opening should the air pressure fall below a minimum. The opening of either valve 46 or 47 or both will reduce the air pressure in chamber 16 to such an extent as to allow the closing of valves 43 in the gas pipes, such valves being arranged to have a tendency to close. It will be understood, however, that while I have shown the safety devices as acting to close the valves 43, they may act to close main valves in the gas main or to operate either directly or indirectly.

The passages or chambers 23, 24 have indicating gages 57, 58 to register the pressures in the respective conduits and at 59 is a similar gage for indicating the pressure in chamber 16.

It will be noticed that all the chambers 29 which are under the control of the master are connected in parallel and similarly the gas chambers 39 are also connected in parallel to the master whereby each burner receives the same impulse which has to be balanced by the same flow and the burners therefore feed the same proportions of air and gas and develop the same amount of heat.

The operation is as follows: Compressed air being supplied to the pipe 17 and the fan supplying the air main 2, started, gas may be admitted to the gas main 1. The compressed air will be allowed by the master controller 21—19—15 to pass in sufficient pressure to hold open the valves 33 and 43 and hence air and gas will flow from the mains to the burners. The diaphragm controlling these valves will be so proportioned and adjusted with respect to the master controller, that the valves will allow just the right proportion of air and gas to pass. Should either the air or gas tend to increase in flow beyond its proper proportion, the increased flow will cause an increase in the differential pressure on the two sides of diaphragms 35 or 44 which will bring about a closure of the valve until the said differential has been restored to again balance the efforts of the master controller acting through diaphragm 30 or 40. In this way, the apparatus may be made to so control the admission of air and gas to the burners to insure the most efficient combustion at all times and through the master controller the volume of gases flowing may be made to vary to suit the demands.

Should the gas supply to the mains fail for any reason so that the pressure in the gas mains falls below a prescribed minimum, then the pressure in chamber 49 will be insufficient to sustain the weight 51 and valve 46 will be opened by the sinking of the weight. The air will then escape so fast from the chamber 15 as to relieve the pressure in chambers 29 and 39 whereupon the valves 33 and 43 will close and shut off both air and gas from the burners. Upon the other hand if the pressure of the air in the air main, should fall below a prescribed minimum, then the weight 55 will cause the opening of relief valve 47 of chamber 15, and thus in a similar manner cause the closure of both the air and gas valves leading to the burners. It will be seen therefore that the apparatus described gives a means of control during operation, and also a means of shut-down in case of failure of proper supply of air or gas.

While I have in the above description given a concrete example of how the invention may be applied to the problem of regulating air and gas flow to burners, the use of the invention may be equally well extended to regulate other fluids such as liquids whose mixture it is desired to control within predetermined limits and in Figure 2 I have shown diagrammatically an arrangement whereby the admixture of two liquids may be regulated. In this case the numerals 60 and 61 indicate supply pipes through which liquids of different densities pass to a conduit 62 in which it is desired to have a mixture of the two liquids that will always contain the same ratio of the two components, even while the total volume may be varied according to the requirements of the system by means of manual or master control. In each of the supply pipes 60 and 61 is inserted a restriction shown at 63 and 64 respectively. On each side of these restrictions, pipes 65, 66 lead to chambers 67 and 68 which have between them diaphragms 69 that through rods 70 operate on levers 71 connecting through levers and rods 72 with valves 73 to the end that when the flow in either supply pipes 60 or 61 varies, the valves will tend to oppose or check this variation and keep it within prescribed limits. These prescribed limits are determined by balancing against such flow controlling means a force sent out, for example, from a master controller such as shown in Figure 1, which force will be proportional to the requirements of the system. The pipes 74 may represent conduits leading from the master controller to chambers which are provided with flexible diaphragms 76 acting through rods 77 in arms 78 in opposition to the efforts of diaphragms 69 so that the master controller may dictate the ratio and total quantity of the fluids, while the local controlling means in the form of the chokes 63, 64, diaphragm 69 and their associated members will prevent fluctuation of the flow in the individual supply pipes from interfering with such prescribed control. The prescribed control may be governed from any distant point and may be manual or automatic. In the latter case the automatic mechanism will itself be controlled or be responsive to the requirements which may, for example, be a desired heating valve, a desired specific gravity or the like.

I claim:—

1. In a flow regulator for controlling the proportional flow of a plurality of constituents, the combination comprising a plurality of supply pipes one for each constituent, means in each pipe for controlling the flow therein, master control means, means responsive to the master control to vary the flow in each pipe, and means responsive to the rate of flow in each pipe to check the said flow varying effort of the master control means.

2. In a flow regulator for controlling the proportional flow of a plurality of constituents, the combination comprising a plurality of supply pipes one for each constituent, means in each pipe for controlling the flow therein, master control means, means responsive to the master control to vary the flow in each pipe by said pipe flow controlling means, and means responsive to the rate of flow in each pipe to check the said flow varying effort of the master control means.

3. In a flow regulator for controlling the proportional flow of a plurality of constituents, the combination comprising a plurality of main supply pipes one for each constituent, a plurality of branch pipes leading therefrom, means in the branch pipes for controlling the flow therein, master control means, means responsive to the master control to vary the flow in each branch pipe, and means responsive to the rate of flow in each branch pipe to check the said flow varying effort of the master control means in said branch pipe.

4. In a flow regulator for controlling the proportional flow of a plurality of constituents, the combination comprising a plurality of main supply pipes one for each constituent, a plurality of branch pipes leading from the main pipes, means in the branch pipes for controlling the flow therein, master control means having loading means for controlling its working range, means responsive to the master control to vary the flow in each pipe by said pipe flow controlling means, and means responsive to the rate of flow in each pipe to check the said flow varying effort of the master control means.

5. In a flow regulator for controlling the proportional flow of a plurality of constituents, the combination comprising a plurality of supply pipes one for each constituent, means in each pipe for controlling the flow therein, master control means, means responsive to the master control to vary the flow in each pipe by said pipe flow controlling means, means responsive to the rate of flow in each pipe to check the said flow varying effort of the master control means, and means at the master controller responsive to the flow in one or more of the pipes to shut off the supply in one or more of the pipes when the flow in one or more of the pipes falls below a given minimum.

6. In a gas burner regulator, the combination comprising gas and air supply pipes, means in each pipe for controlling the flow therein, master control means, means responsive to such control to vary the flow of gas and air to the burners, means responsive respectively to the rate at which the gas and air flows through the pipes to check the said flow varying means.

7. In a gas burner regulator, the combination comprising gas and air supply pipes, means in each pipe for controlling the flow therein, remote control means, means responsive to such control to increase the flow of gas and air, and means responsive respectively to the rate at which the gas and air flows through the pipes to check the said increasing flow means.

8. In a gas burner regulator, the combination comprising gas and air supply pipes, a plurality of burners supplied from said pipes, means in the individual burner supply pipes for controlling the flow therein, said means comprising means responsive to the demands, for increasing and decreasing the flow, and means balanced against said flow control means, the said balancing means being responsive to the flow in each individual burner supply pipe.

9. In a gas burner regulator, the combination comprising gas and air supply pipes, means in each pipe for controlling the flow therein, remote control means having loading means for controlling the working range of the burner, means responsive to such control to increase the flow of gas and air, and means responsive respectively to the rate at which the gas and air flows through the pipes opposed to the increasing flow means to check the increasing flow.

10. In a gas burner regulator, the combination comprising gas and air supply pipes, a plurality of burners supplied from said pipes, a master controller, means in the individual burner supply for controlling the flow therein, said means comprising means responsive to the general demands of the master controller for increasing and decreasing the flow, and checking means balanced against said flow control means, the said checking means being responsive to the flow in each individual burner supply.

11. In a gas burner regulator, the combination comprising gas and air supply pipes, means in each pipe for controlling the flow therein, master control means having loading means for controlling the working range of the burner, means responsive to such control to vary the flow of gas and air to the burners, means responsive respectively to the rate at which the gas and air flow through the individual burner pipes to check the said flow varying means, and means at the controller responsive to the gas pressure for shutting off the supply of gas when the gas pressure falls below a given minimum.

12. In a gas burner regulator, the combination comprising gas and air supply pipes, means in each pipe for controlling the flow therein, master control means having loading means for controlling the working range of the burners, means responsive to such control to vary the flow of gas and air to the burners, means responsive respectively to the rate at which the gas and air flows through the individual burner pipes to check the said flow varying means, and means at the controller responsive to the air pressure for shutting off the supply of gas when the air pressure falls below a given minimum.

13. In a gas burner regulator, the combination comprising gas and air supply pipes, means in each pipe for controlling the flow therein, master control means having loading means for controlling the working range of the burners, means responsive to such control to vary the flow of gas and air to the burners, means responsive respectively to the rate at which the gas and air flows through the individual burner pipes to check the said flow varying means, and means at the controller responsive to the gas or air pressure for shutting off the supply of gas when the gas or air pressure falls below a given minimum.

14. In a system of control for gas burners, the combination comprising main pipes for supplying respectively gas and air under pressure, individual gas and air burner pipes leading from the mains to burners, a master controlling means having loading means for keeping the flow of air and gas proportionate to the demands of the loading within the working range, means in the individual gas and air burner pipes for controlling the flow of gas and air to each burner, said flow control means being coupled to a mechanism moved in one direction in response to the efforts of the master control means, and in the reverse direction in response to a differential pressure due to the flow in each individual burner pipe.

15. In a system of control for gas burners, the combination comprising main pipes for supplying respectively gas and air under pressure, individual gas and air burner pipes leading from the mains to burners, a master controlling means having a chamber adapted to be supplied with fluid under pressure and having loading means controlling the pressure in said chamber for keeping the flow of air and gas proportionate to the demands of the loading within the working range, means in the individual gas and air burner pipes for controlling the flow of gas and air to each burner, said flow control means being coupled to a mechanism moved in one direction in response to the efforts of the master control means, and in the reverse direction in response to a differential pressure due to the flow in each individual burner pipe.

CHARLES H. SMOOT.